United States Patent Office 3,497,790
Patented Feb. 24, 1970

3,497,790
WINDSCREEN WIPER CONTROL CIRCUITS
Michel Tixier, Billancourt, France, assignor to Regie Nationale des Usines Renault, Billancourt, France
Filed Jan. 30, 1967, Ser. No. 612,541
Claims priority, application France, Feb. 4, 1966, 48,543
Int. Cl. H02p 1/04, 3/00, 7/00
U.S. Cl. 318—466          3 Claims

ABSTRACT OF THE DISCLOSURE

Electric control for stopping a windscreen wiper in a preselected position, which comprises a two-position reversing switch, one position for normally energizing the motor and the other for controlling the stopping thereof in a predetermined wiper blade position, characterised in that, in the first position the motor is in series with the bimetal strip heating winding and that in the second position the bimetal strip by cooling down cuts off the motor energization after the blades have attained their preselected stop position.

---

Figure 1:
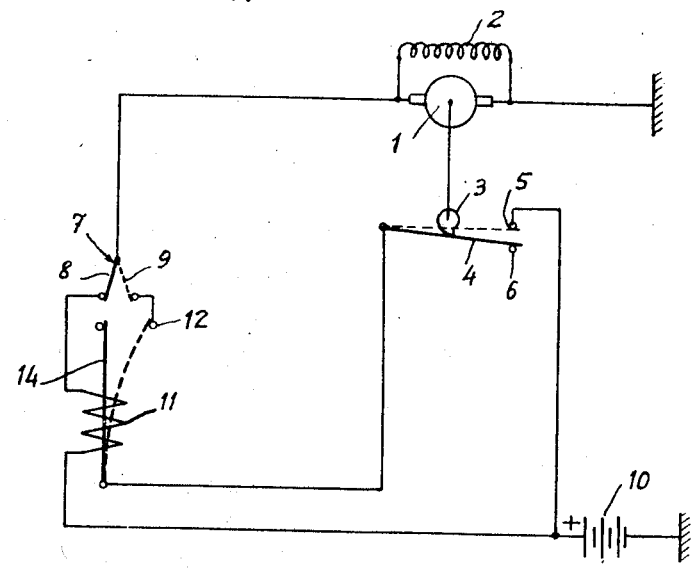

This invention relates to improvements in the control circuits of electric windscreen wipers adapted to stop automatically in a predetermined position.

Electro-motor windscreen wiper circuits adapted automatically to stop the wiper blades in a predetermined position are in current use. Some of these circuits comprise notably a single-pole three-way reversing switch having a momentary position due to the presence of a return spring urging the switch movable member to its inoperative position when this member is released; this position is energized through a contact adapted to be closed periodically by a cam driven from the motor shaft or by brush contacts in frictional engagement with concentric tracks of the motor shaft. With this arrangement, when the single-pole reversing switch is actuated to stop the motor, the certainty is obtained that the energization of the electric motor is safely discontinued irrespective of the wiper blade position, since this reversing switch is caused automatically to resume its inoperative position by the action of said return spring. This arrangement is advantageous notably in that it eliminates the following inconveniences:

It may happen that after the driver has actuated the switch to its "OFF" position the electric motor is stalled for example because the wiper blades are locked by snow accumulating between the windscreen beading and said blades, before the preselected fixed stop position is attained. In this case the motor armature is still energized and there is a likelihood that the motor may be destroyed by overheating.

Another possibility is that the reaction torque resulting from the inertia of the movable assembly exceeds the armature braking torque (for example when the wiper blades are freed from their inoperative position when the vehicle is being driven at a relatively high speed). In this alternate case the cam oversteps the stop position, the armature is carried along by the blades and the motor is re-energized, possibly during several successive cycles.

Finally, if the windscreen control switch is connected in series with the ignition contact, it is a frequent occurrence that the drivers of vehicles turn off this switch while the windscreen wiper is still operating. Under these conditions the blades are stopped in a position which is not the preselected stop position, and they are subsequently re-started after a variable time period when the vehicle engine itself is re-started. Now it frequently happens, in winter, that after this time period the wiper blades are strongly stuck to the windscreen surface by frost. Since in this case, when the vehicle engine is started again the driver does not always remember that the windscreen wiper switch is still ON, the windscreen wiper motor may be destroyed by overheating since it is energized without having the possibility of operating normally.

However, the use of the above-mentioned single-pole three-way reversing switch requires the intervention of the driver who must move the switch arm to its momentary position until the windscreen wiper blades are stopped in their actual preselected fixed stop position.

It is the object of this invention to provide a device utilizing a windscreen-wiper switch having only two positions, this device operating automatically like a three-way switch due to the use of a heat-responsive switch adapted to de-energize the windscreen-wiper motor a certain time after the latter has been stopped.

Figure 2:
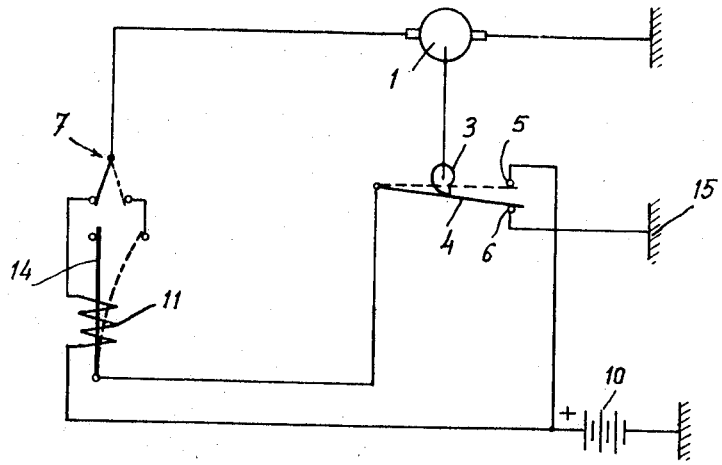

In order to afford a clearer understanding of this invention and of the manner in which the same may be carried out in practice, reference will now be made to the accompanying drawing illustrating diagrammatically by way of example two typical forms of embodiment of the device of this invention. In the drawing:

FIGURE 1 is a wiring diagram of the automatic windscreen wiper control circuit in the case of a driving motor of the excitation-winding type, and FIGURE 2 is an alternate form of embodiment wherein the electric motor is of the permanent-magnet type, the armature thereof being adapted to be braked in the preselected stop position by short-circuiting said armature.

Referring first to FIGURE 1 of the drawing it will be seen that the wiring diagram illustrated therein comprises an electric motor 1 having an excitation winding 2 and an output shaft provided with a cam 3 adapted to actuate a follower arm 4 engaging alternately the terminal 5 or the fixed stop or free terminal 6, the first terminal 5 being connected to the positive terminal of the source of current, i.e. the storage battery 10. A reversing switch 7 having two positions 8 and 9 connects one of the motor terminals either in position 8 through the winding 11 of a bimetal strip 14 to the positive terminal 10 of the battery, or in position 9 to the switch terminal 12, bimetal strip 14 and cam follower arm 4 then engaging the terminal 5.

This circuit arrangement operates as follows:

(1) When switch 7 is in position 8 (operative position) the electric motor 1 is energized directly from the storage battery 10 through the winding 11. The current flowing through this winding 11 will heat the bimetal strip 14 which expands and engages the contact 12 without modifying the direct energization of the electric motor.

(2) When switch 7 is in position 9 (stop or inoperative position) the motor is energized from the battery 10 through terminal 5, cam follower arm 4, bimetal strip 14 and terminals 12 and 9. When the blades are in the preselected fixed stop position the cam 3 moves it followers arm 4 to its position of engagament of the free terminal 6; as the motor energizing circuit is open the motor is stopped.

After a predetermined time period the bimetal strip 12 cools down and resumes its inoperative position, thus opening the circuit 7, 9 and 12 and safely avoiding any damage to the motor in case of faulty operation of the control means, this motor being prevented from remaining or being energized for example in case:

(a) Snow accumulates under the windscreen wiper blades and cam 3 has not lifted its follower arm 4;

(b) The wiper blades being shifted strike, or rebound against, the windscreen beading and cannot stop in the preselected fixed stop position whereat the cam lifts the follower arm 4;

(c) Frost causes the wiper blades to stick to the windscreen and the wiper is started again by turning ON the engine ignition key switch when the latter is connected in series with the windscreen wiper motor.

The arrangement illustrated in FIGURE 2 has the following differences with respect to the circuit of FIGURE 1:

the excitation winding 2 is replaced by permanent magnets;
the terminal 6 is grounded.

The operation is the same as in FIGURE 1 except in the final phase, when the follower arm 4 is moved by the cam 3. At this time the armature of motor 1 is braked by being short-circuited through the ground at 15 and the circuit 6, 4, 14, 12, 9, 7 and 1.

It will be noted that the bimetal strip will preferably be of the winding type which heats up as rapidly as possible; however, the thermal inertia of this strip when cooling down should be at least equal to the time necessary for the windscreen-wiper blades to make a complete to-and-fro movement.

It would not constitute a departure from the scope of this invention to substitute for the indirect-heating bimetal strip any other equivalent and suitable time-lag device such as heat-expansion wire, time-switch, etc.

What I claim is:

1. An electric control device for stopping the blades of a windscreen wiper system at a preselected position comprising a windscreen wiper motor, a current source, a double throw single pole switch, the first position of which normally connects said current source to energize said motor and the second position controls the de-energization thereof, a bimetal strip and a bimetal strip heating winding connected to said source in parallel, said winding being connected in series to said first switch position and disposed to heat said bimetal strip, said bimetal strip having a heated position in which it serially connects said second switch position to said current source and a cooled position out of contact with said switch whereby said bimetal strip will keep said motor energized for a period after said switch is moved from said first to said second position, a cam actuated switching means having normally closed contacts in series with said current source and said bimetal strip, and cam means driven by said motor to open said contacts when said blades are in a preselected position.

2. An electric control device according to claim 1 in which said motor has an armature and is excited by a permanent magnet, said cam actuated switch short-circuiting said armature to stop said motor in said preselected position, 3. An electric control device for stopping the blades of a windscreen wiper system at a preselected position comprising a windscreen wiper motor, a current source, a double throw, single pole switch the first position of which normally connects said current source to energize said motor and the second position controls the deenergization thereof, means connecting said current source to said second position including means to open said connection after a time delay to thus deenergize said motor.

References Cited

UNITED STATES PATENTS

| 2,307,204 | 1/1943 | Ehrlich | 318—379 X |
| 2,364,603 | 12/1944 | Coxon et al. | 318—379 X |
| 2,611,116 | 9/1952 | Latta et al. | 318—379 X |
| 2,651,013 | 9/1953 | Bohl | 318—369 X |
| 3,253,206 | 5/1966 | Romanowski | 318—472 X |
| 2,560,000 | 7/1951 | Sacchini | 318—275 |

FOREIGN PATENTS 775,631    8/1955    Great Britain.

ORIS L. RADER, Primary Examiner

A. G. COLLINS, Assistant Examiner

U.S. Cl. X.R.

318—275, 369, 472